(12) United States Patent
VanPelt

(10) Patent No.: US 6,497,426 B2
(45) Date of Patent: Dec. 24, 2002

(54) CONVERTIBLE BICYCLE

(76) Inventor: James L. VanPelt, 203 S. Main St., Minerva, OH (US) 44657-1831

( * ) Notice: Subject to any disclaimer, the term of this patent is extended or adjusted under 35 U.S.C. 154(b) by 0 days.

(21) Appl. No.: 09/860,385

(22) Filed: May 18, 2001

(65) Prior Publication Data

US 2001/0045724 A1 Nov. 29, 2001

Related U.S. Application Data

(60) Provisional application No. 60/206,274, filed on May 23, 2000.

(51) Int. Cl.[7] .................. B62K 13/00; B62K 13/02; B62K 15/00
(52) U.S. Cl. ...................... 280/287; 280/288.1
(58) Field of Search .............. 280/281.1, 287, 280/288.1, 7.1, 7.11, 7.15, 7.16, 7.17

(56) References Cited

U.S. PATENT DOCUMENTS

| | | | |
|---|---|---|---|
| 3,608,917 A | * | 9/1971 | Cogliano .................. 280/209 |
| 3,854,755 A | * | 12/1974 | Tang ...................... 280/278 |
| 3,945,667 A | * | 3/1976 | Cipres .................... 280/261 |
| 4,248,448 A | | 2/1981 | Dmitrowsky |
| 4,502,705 A | | 3/1985 | Weaver |
| 4,666,172 A | | 5/1987 | Hartmann |
| 5,072,961 A | | 12/1991 | Huppe |
| 5,078,416 A | | 1/1992 | Keyes |
| 5,282,639 A | | 2/1994 | Chen |
| 5,419,574 A | | 5/1995 | Krumm |
| 5,584,494 A | * | 12/1996 | Krumm ................... 280/288.1 |
| 5,620,196 A | | 4/1997 | Belik |
| 5,951,034 A | | 9/1999 | Mayo |

FOREIGN PATENT DOCUMENTS

| | | | |
|---|---|---|---|
| DE | 38 37 018 A1 | 5/1990 | |
| DE | 19739945 A1 | * 3/1999 | ........... B62K/17/00 |

* cited by examiner

Primary Examiner—Kevin Hurley
(74) Attorney, Agent, or Firm—Sand & Sebolt

(57) ABSTRACT

The bicycle of the invention provides a frame having forward and rear frame portions that are selectively attach and detach from each other in upright and recumbent positions. In the upright position, cranks are connected to a gear box that is adapted to drive a typical chain sprocket. In the recumbent position, the cranks are removed from the rear gear box and are attached to a forward gear box. A drive shaft is positioned between the gear boxes so that the bicycle rider may power the bicycle from the forward gear box. The bicycle may also be configured to be used as a tandem with a second set of cranks attached to the rear gear box.

20 Claims, 9 Drawing Sheets

US 6,497,426 B2

CONVERTIBLE BICYCLE

CROSS REFERENCE TO RELATED APPLICATIONS

This application claims priority from U.S. Provisional Application Ser. No. 60/206,274 filed May 23, 2000; the disclosures of which are incorporated herein by reference.

BACKGROUND OF THE INVENTION

1. Technical Field

The present invention generally relates to bicycles and, more particularly, to bicycles that are convertible between different riding configurations. Specifically, the present invention relates to a bicycle that can be quickly and easily configured in an upright position, a recumbent position, and a tandem position.

2. Background Information

A bicycle is a two-wheeled vehicle that is propelled by energy supplied by the rider. The most traditional form of a bicycle includes a chain and sprocket drive mechanism wherein a small sprocket is attached to the rear wheel and a large sprocket is attached to a crank mechanism that allows the user to provide energy to the bicycle through his legs. The bicycle typically has two wheels of equal size. A steering mechanism allows the front wheel to be turned relative to the rear wheel to allow the bicycle to be guided through turns. The traditional upright bicycle locates the pedals generally below the seat of the rider such that the rider's weight shifts from one foot to the other during forward propulsion. One problem with this type of bicycle is that the rider's center of gravity is positioned above the majority of the bicycle frame.

In general, a longer wheel base and a lower center of gravity provides greater stability. A recumbent bicycle is generally longer than a conventional upright bicycle and positions the rider in a lower position to the ground. The rider is generally sitting in a slightly reclined position while riding a recumbent bicycle. Recumbent bicycles provide increased comfort, greater pedal efficiency, and a lower center of gravity compared to the conventional upright bicycle.

Tandem bicycles are also known in the art. A tandem bicycle allows two riders to power a single bicycle unit that typically has a pair of crank mechanisms driving a single wheel or a pair of crank mechanisms driving individual wheels.

The art generally desires a bicycle configuration that allows the user to selectively configure his bicycle between the upright, recumbent, and tandem positions so that the user may enjoy the benefits of all three types of bicycle configurations while only purchasing a single bicycle. Although some prior art devices provide a conversion function, the devices either require the greasy chain to be manually moved between sprockets, position the seat too high, or require relatively complicated pivoting arrangements to move the elements of the bike between the different positions. The art desires the conversion to be simple and clean so that the user will not hesitate to make the conversion when desired.

One type of conversion configuration for a bicycle is disclosed in U.S. Pat. No. 5,951,034. The conversion apparatus disclosed in this patent is functional but includes some undesirable drawbacks. U.S. Pat. No. 5,620,196 allows a recumbent bicycle to be connected with other recumbent bicycles (FIG. 6) so that a tandem bicycle may be created. U.S. Pat. No. 5,419,574 discloses a bicycle frame that allows the crank to be positioned in a variety of different positions. U.S. Pat. No. 4,502,705 discloses a semirecumbent tandem bicycle but includes a relatively complicated chain drive that is used by the front rider. U.S. Pat. No. 4,248,448 discloses a bicycle that allows the user to sit in an upright position or lie forward in a prone riding position. German document DE 3837-018-A discloses a bicycle having an adjustable riding position that includes a seat and pedal arrangement on a hinged frame configuration that allows the seat to pivot rearwardly and downwardly while pivoting the crank mechanism upwardly. Each of the bicycle configurations noted above has at least one undesirable aspect and room for improvement remains in the art.

SUMMARY OF THE INVENTION

In view of the foregoing, the present invention provides a bicycle that may be selectively configured in one of an upright, recumbent, or tandem position. The invention provides a bicycle that may be selectively configured without requiring the user to move the chain of the drive mechanism. The bicycle of the present invention achieves this objective by providing gear boxes in the drive mechanism of the bicycle. When the bicycle is converted from the upright to the recumbent position, a drive shaft is placed between a front gear box and the rear gear box to allow the user to drive the rear drive mechanism with a front crank assembly.

The invention also provides a frame configuration that uses quick-disconnect locking clips to hold the frame together in its different configurations.

The bicycle also provides a configuration that positions the rider's seat below the top of the rear wheel in the recumbent position so that the recumbent bicycle is easy to ride.

BRIEF DESCRIPTION OF THE SEVERAL VIEWS OF THE DRAWINGS

The preferred embodiments of the invention, illustrative of the best mode in which applicant contemplated applying the principles of the invention, are set forth in the following description and are shown in the drawings and are particularly and distinctly pointed out and set forth in the appended Claims.

Similar numbers refer to similar parts throughout the specification.

DETAILED DESCRIPTION OF THE INVENTION

Figure 1:
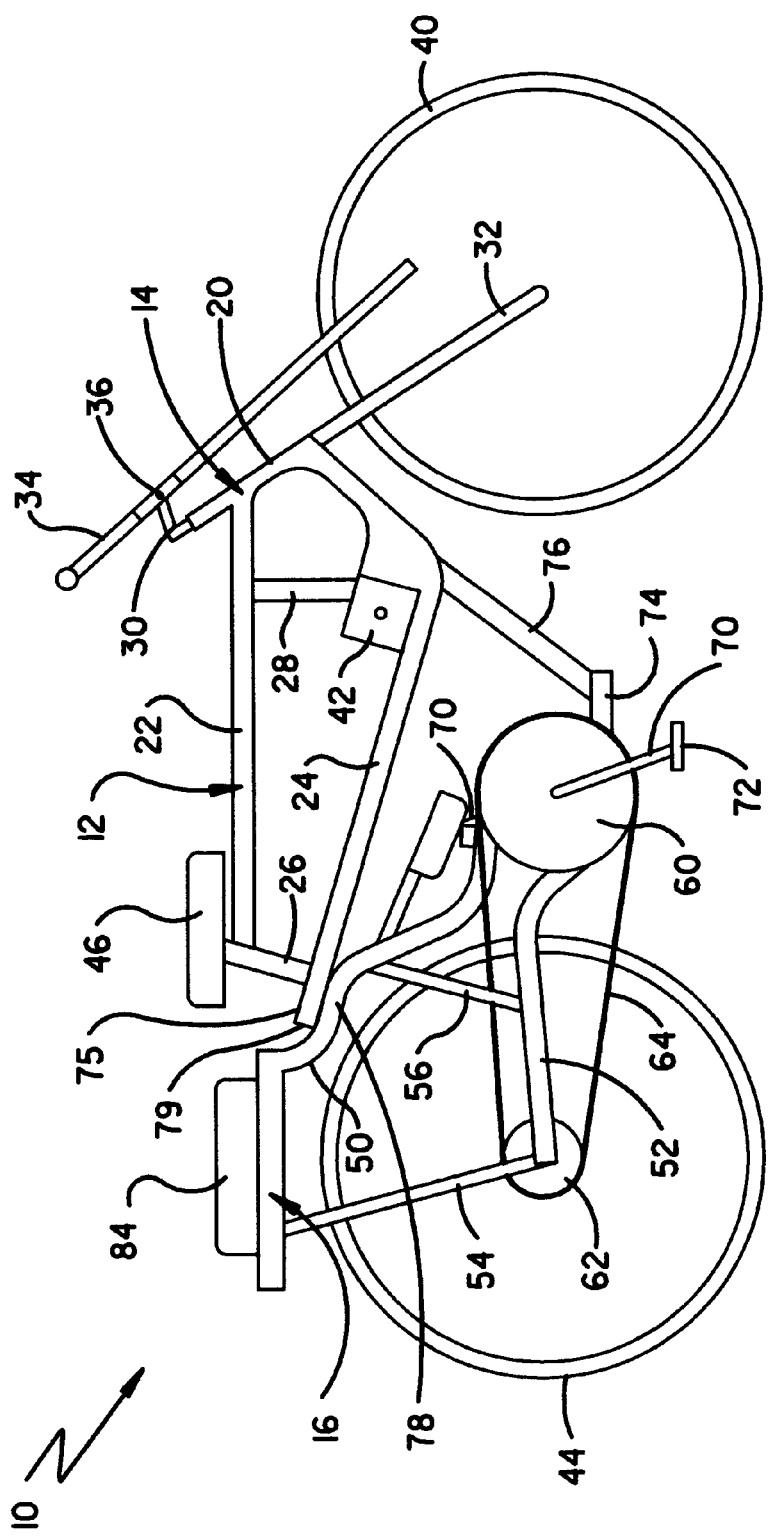
FIG. 1 is a side elevational view of the first embodiment of the bicycle of the present invention in the upright position.

The first embodiment of the bicycle of the present invention is indicated generally by the numeral 10 in FIGS. 1–6. Bicycle 10 is selectively convertible between the upright position depicted in FIG. 1, the recumbent position depicted in FIG. 4, and the tandem position depicted in FIG. 5.

Bicycle 10 includes a frame 12 having a forward frame portion 14 and a rear frame portion 16. In general, forward frame portion 14 and rear frame portion 16 connect together at different locations to convert bicycle 10 between the upright position and the recumbent position. Frame portions 14 and 16 may be fabricated from a variety of different materials as is known in the art.

Forward frame portion 14 includes a head tube 20, an upper tube 22, a lower tube 24, and a seat post tube 26. Forward frame portion 14 may additionally include reinforcing members such as member 28. Tubes 20, 22, 24, and 26 are connected together to form a strong, unitary frame portion 14. The members are preferably connected by welds but may be integrally formed as is known in the art.

A neck 30 and a set of forks 32 are supported in head tube 20 in a rotating manner. Neck 30 supports handle bars 34 in an adjustable manner. Neck 30 includes a clamp 36 that selectively clamps handle bar 34. Handle bars 34 may be adjusted by loosening clamp 36 and extending or retracting handle bar 34 with respect to neck 30 as may be seen by comparing FIGS. 2 and 3.

The front wheel 40 is carried on the lower end of fork 32 in a manner known in the art. Wheel 40 may be any of a variety of sizes of wheels known to be used with bicycles. Fork 32 extends far enough from lower tube 24 to provide clearance to wheel 40 to pivot with respect to lower tube 24.

Forward frame portion 14 also carries the forward gear box 42 that allows the user to drive the rear wheel 44 of bicycle 10 when bicycle 10 is in the recumbent position. Gear box 42 includes an input that accepts rotary motion, a plurality of gears, and an output that is disposed about 90 degrees with respect to the input shaft. Various types of mechanisms known in the art may be used for box 42.

Seat post 26 receives seat 46 in a telescoping manner. A clamp may be provided to allow the height of seat 46 to be adjusted with respect to seat post 26.

Rear frame portion 16 generally includes an upper tube 50, lower tubes 52, rear supports 54, and optionally includes support tubes 56. Lower tubes 52, rear supports 54, and support tubes 56 are formed in pairs disposed on either side of rear wheel 44.

A drive sprocket 60 is carried by rear frame portion 16 in a position generally below seat 46 when bicycle 10 is in the upright configuration. A follower sprocket 62 is carried by rear wheel 44 and connected to drive sprocket 60 by a chain 64.

Figure 6:
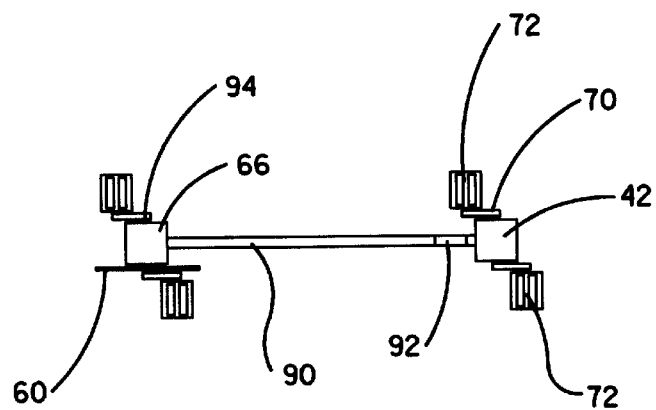
FIG. 6 is a plan view of the front portion of the drive mechanism taken along line 6—6 of FIG. 5.

In accordance with one of the objectives of the present invention, drive sprocket 60 is connected to the output of a rear gear box 66 (FIG. 6). Rear gear box 66 functions the same as gear box 42 described above. Gear box 66 is connected to a pair of cranks 70 that support pedals 72.

Rear frame portion 16 further includes a connector half that is preferably in the form of a female connector 74 that is configured to cooperate with another connector half that is preferably in the form of a male connector 75 of forward frame portion 14. In the upright configuration, a secondary support member 76 extends from rear frame portion 16 adjacent female connector 74 up to lower tube 24 adjacent forward gear box 42. Secondary support member 76 maintains the rigidity of frame 12 when bicycle 10 is in the upright configuration. Secondary support member 76 may be connected to frame portions 14 and 16 by any of a variety of connectors known in the art.

Rear frame portion 16 further includes half of an upright frame connector 78 disposed toward the upper portion of upper tube 50. Connector 78 may be any of a variety of connectors known in the art such as pins, a nut and bolt connection, a sliding connection, an interference fit, a clamp, etc. Connector 78 is configured to cooperate with the other connector half 79 formed on forward frame portion 14. In the upright frame configuration, connector 78 is connected to connector 79 to hold the rear end of lower tube 24 to the upper portion of upper tube 50.

Figure 4:
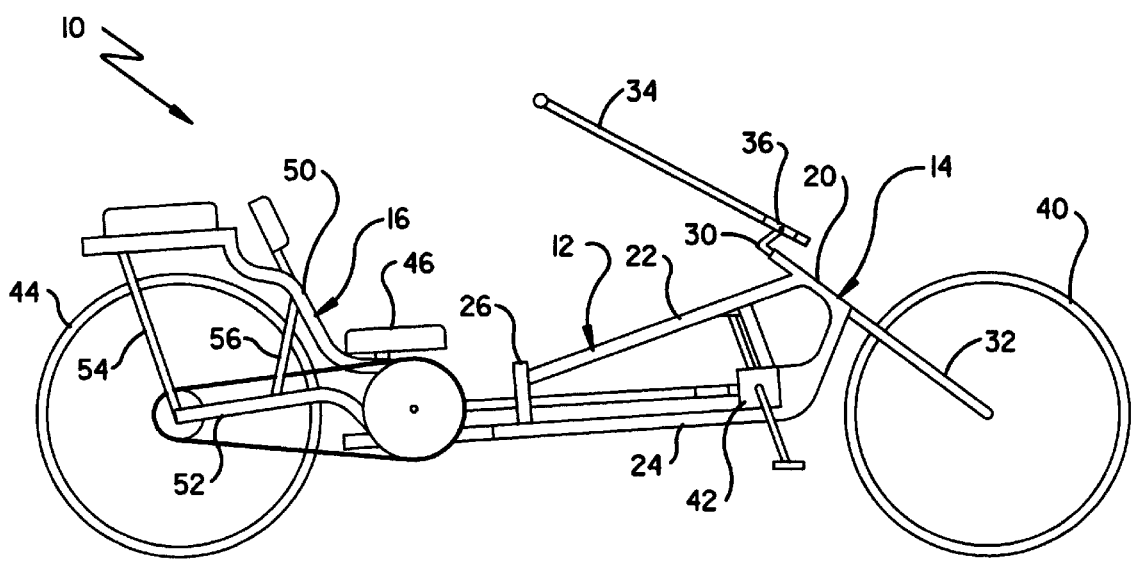
FIG. 4 is a view similar to FIG. 3 showing the first embodiment of the bicycle in the recumbent configuration.

Rear frame portion 16 further includes a lower seat mount 80 disposed immediately above rear gear box 66. Lower seat mount 80 is preferably connected to the lower end of upper tube 50. Lower seat mount 80 is configured to receive seat tube 46 when frame 12 is configured in the recumbent configuration as depicted in FIG. 4.

Figure 3:
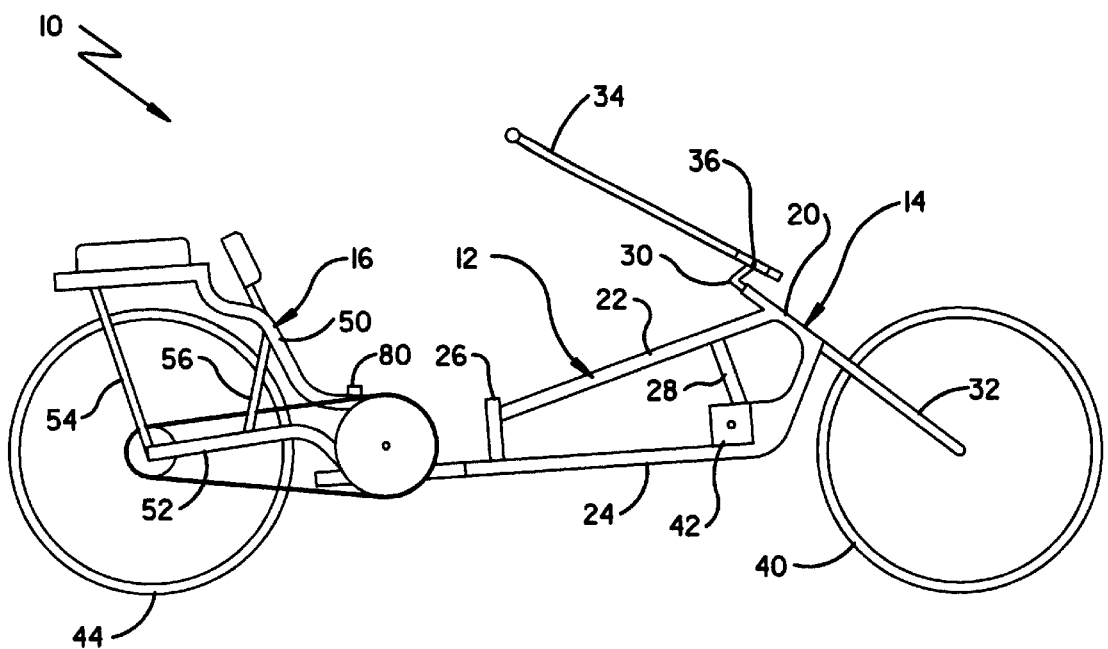
FIG. 3 is a view similar to FIG. 1 showing the first step of converting the first embodiment from the upright position to the recumbent position.

A seat back 82 is pivotally connected to upper tube 50. In the upright configuration, seat back 82 is pivoted down below lower tube 24. When frame 12 is moved to the recumbent position, seat back 82 is pivoted upwardly as depicted in FIG. 3 to provide support to the user's back. An appropriate stop disposed between upper tubes 50 prevents seat back 82 from moving back too far. In another embodiment of the invention, seat back 82 engages upper tubes 50 to stop the pivoting movement.

A tandem seat 84 is supported on the horizontally-extending rear portions of upper tubes 50.

The user of bike 10 may configure frame 12 in the upright configuration by connecting the rear portion of lower tube 24 to the upper portion of upper tubes 50 by joining connector halves 79 and 78. The user than connects lower tube 24 to lower tube 52 by installing secondary support member 76. The user connects cranks 70 to rear gear box 66 and adjusts handle bars 34 so that they are in a comfortable position. The user may then ride bicycle 10 as he would most upright bicycles.

Figure 2:
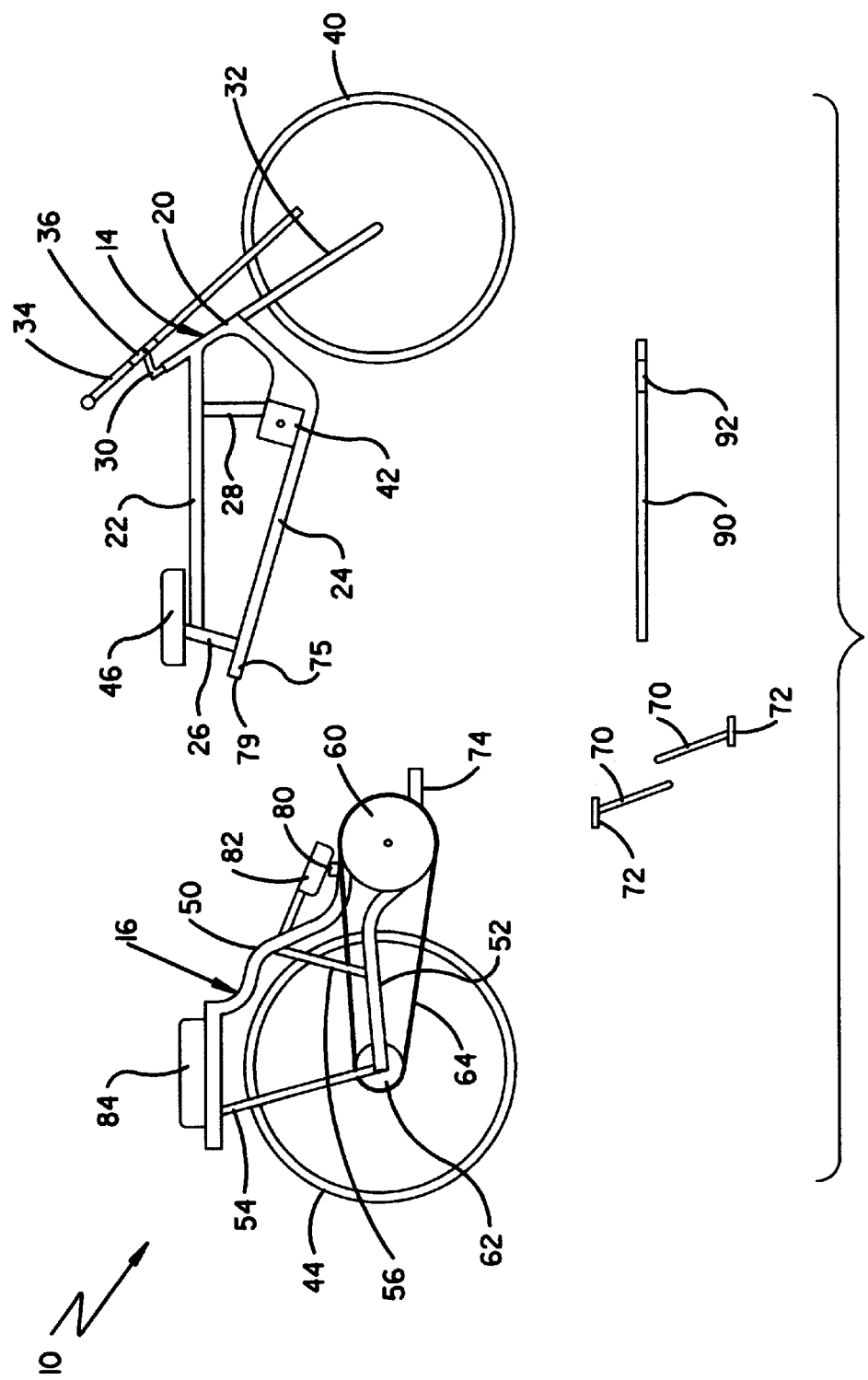
FIG. 2 is an exploded view of the first embodiment of the invention.
Figure 5:
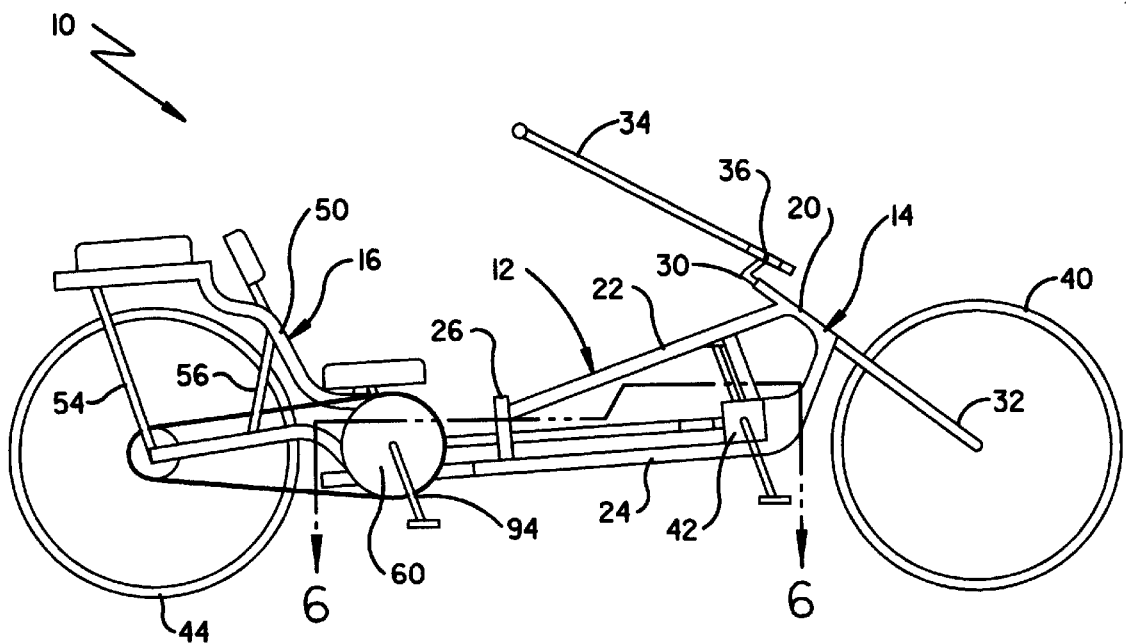
FIG. 5 is a view similar to FIG. 4 showing the first embodiment of the bicycle in the tandem configuration.

When the user wants to convert bicycle 10 to a recumbent configuration, the user disconnects forward frame portion 14 from rear frame portion 16 as shown in FIG. 2. The user also removes cranks 70 from rear gear box 66. The user than connects the rear end of lower tube 24 to the forward end of lower tubes 52 to connect forward frame portion 14 to rear frame portion 16 as shown in FIG. 3. The user also pivots seat back 82 to the upright position. As shown in FIG. 3, the connection of forward frame portion 14 with rear frame portion 16 aligns forward gear box 42 with rear gear box 66. The user than obtains drive shaft 90 having a retractable end piece 92. In the preferred embodiment, drive shaft 90 is carried on frame 12 until needed. The user installs drive shaft 90 between gear boxes 42 and 66 as shown in FIGS. 4–6. The retractable end piece 92 is spring loaded and allows drive shaft 90 to be compressed to a shorter length while it is being installed. The user than installs cranks 70 on gear box 42. The user lastly adjusts handle bars 34 to a comfortable position for recumbent riding.

Bicycle 10 may be configured for tandem riding by adding a secondary crank 94 to drive sprocket 60. The second rider sits on tandem seat 84 and pedals secondary crank 94. The second rider may hold onto the first rider or may connect a handle bar to rear frame portion 16.

The second embodiment of the bicycle of the present invention is indicated generally by the numeral 100 in FIGS. 7–10. Bicycle 100 generally includes a frame 112 that includes a forward frame portion 114 and a rear frame portion 116. Bicycle 100 is capable of being converted between the upright position depicted in FIG. 7, the recumbent position depicted in FIG. 9, and the tandem position depicted in FIG. 10.

Figure 7A:
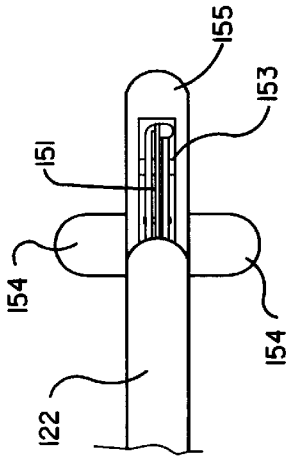
FIG. 7A is an enlarged view of the frame immediately behind the upright seat before the frame is locked together.
Figure 7B:
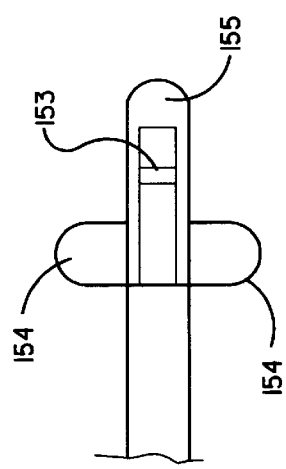
FIG. 7B is a view similar to FIG. 7A with the upper tube locked in place.
Figure 7:
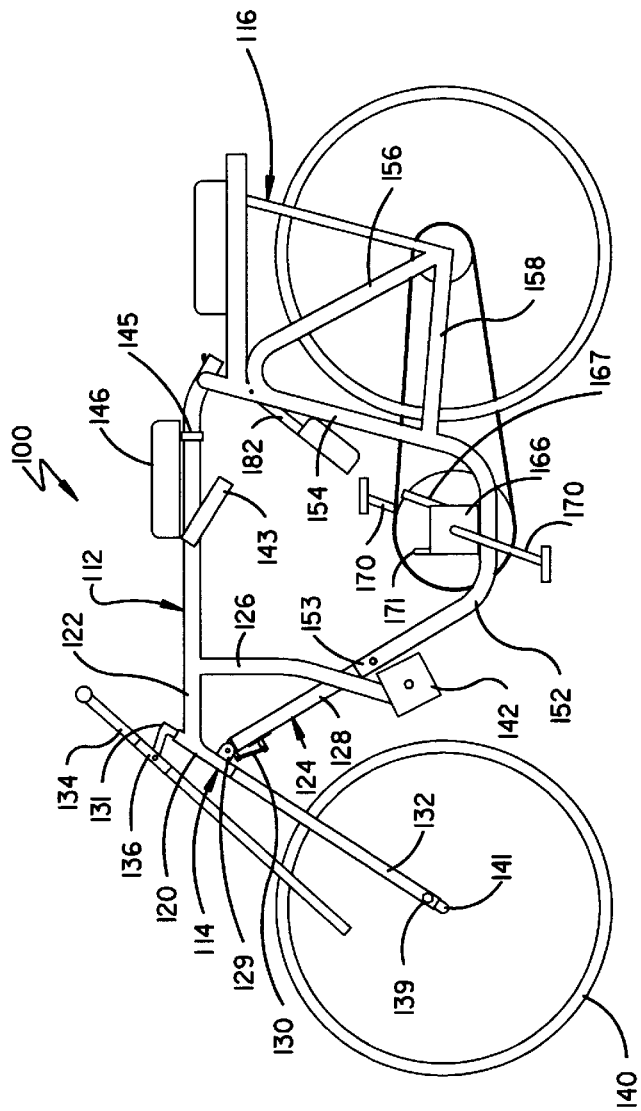
FIG. 7 is a side elevational view of the second embodiment of the present invention in an upright position.

Forward frame portion 114 includes a head tube 120, an upper tube 122, a lower tube 124, and a support tube 126. In accordance with one of the objectives of the invention, lower tube 124 includes a first telescoping portion 127 and a second telescoping portion 128 that slide over one another to allow the length of lower tube 124 to be selectively adjusted. Lower tube 124 is pivotally connected to head tube 120 by an appropriate pivotal connector 129 such as a pin. The length of lower tube 124 is locked in place by a clip 130 connected to second telescoping portion 128 and head tube 120. Clip 130 holds lower tube 124 in its compressed or retracted position when bicycle 100 is in the upright configuration as shown in FIG. 7.

Figure 8A:
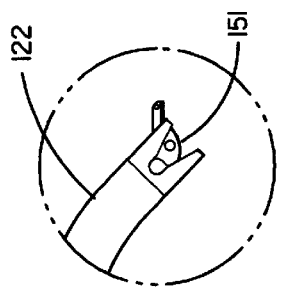
FIG. 8A is an enlarged view of the encircled portion of FIG. 8.
Figure 8:
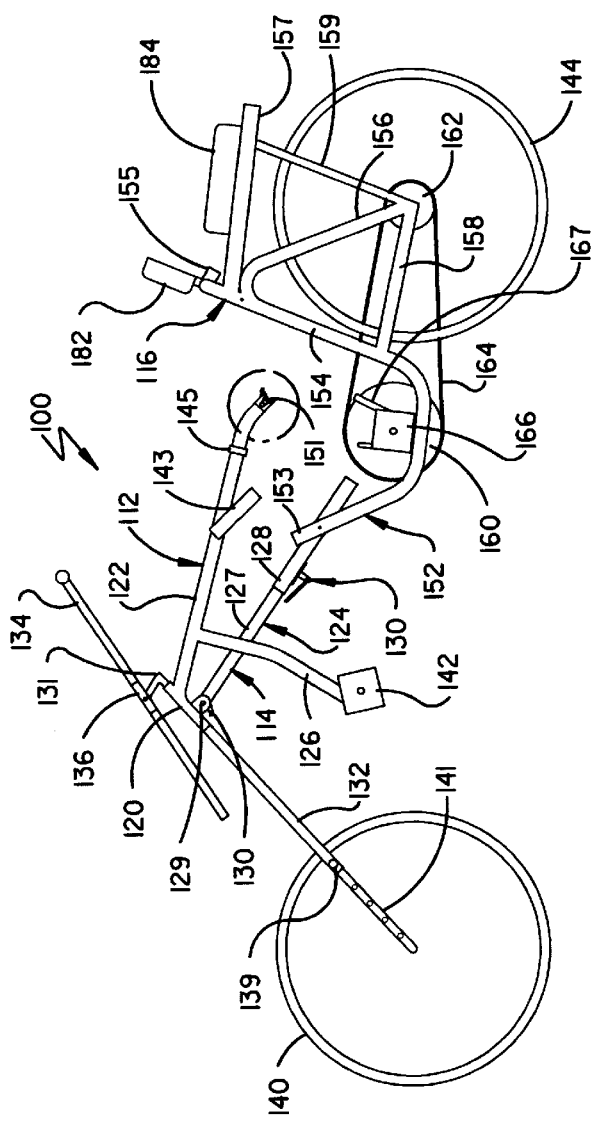
FIG. 8 is a view similar to FIG. 7 showing the frame of the second embodiment being disconnected and converted to the recumbent position.

Bicycle 100 further includes a neck 131 that is connected to forks 132. Handle bars 134 are connected to neck 131 by an appropriate clamp 136 that allows the length of handle bars 134 to be adjusted. The front wheel 140 is connected to the end of forks 132 in a manner known in the art. In accordance with another objective of the present invention, forks 132 have an adjustable length as shown in FIG. 8 so that front wheel 140 may be moved away from forward frame portion 114 when bicycle 100 is in the recumbent configuration. Fork 132 may include a telescoping member 141 and an appropriate connector or clamp 139 that locks fork 132 at its selected length.

Figure 9:
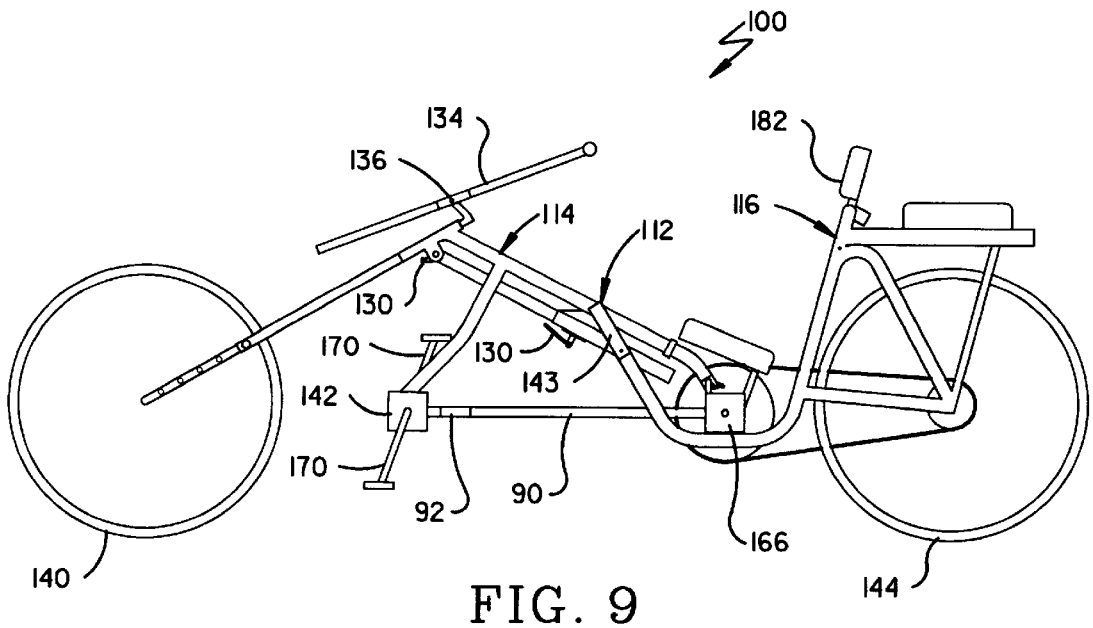
FIG. 9 is a view similar to FIG. 7 showing the second embodiment of the bicycle in the recumbent position.

A forward gear box 142 is carried on support tube 126 in a position where it is aligned with the rear gear box 166 when bicycle 100 is in the recumbent configuration as shown in FIG. 9.

A pair of upper support tubes 143 are connected to either side of upper tube 122 in a position that allows upper support tubes 143 to cooperate with rear frame portion 116 when frame 112 is configured in the recumbent configuration as depicted in FIG. 9. Each upper support tube 143 is preferably angled downwardly and rearwardly. Each support tube 143 may include the female half of a connector such that rear frame portion 116 slides into tubes 143. An appropriate connector or locking mechanism is provided to hold rear frame portion 116 and upper support tubes 143 together when frame 112 is in the recumbent configuration. Upper tube 122 also supports a pair of seat posts 145 that slidingly receive seat 146 when frame 112 is in the upright configuration as depicted in FIG. 7. Seat 146 includes a pair of prongs that are received in posts 145. Appropriate connectors hold seat 146 in place so that it does not fall out of place during use of bicycle 100. Various other types of seat connectors that mount seat 146 to frame 112 may also be used without departing from the concepts of the invention.

The rear end of upper tube 122 includes a clip 151 configured to selectively engage rear frame portion 116. Clip 151 is designed to automatically lock onto a pin 153 (FIGS. 7A and 7B) when clip. 151 engages pin 153. The user must manually release clip 151 from pin 153 in order to separate upper tube 122 from rear frame portion 116. In other embodiments of the invention, connectors other than clip 151 may be used without departing from the concepts of the present invention. For instance, a removable pin may be used to selectively connect upper tube 122 to rear frame portion 116. Similarly, a nut and bolt combination may be used.

Rear frame portion 116 includes a pair of lower tubes 152 that are pivotally connected to second telescoping portion 128 of lower tube 124. Each lower tube 152 includes a top portion 153 that is configured to cooperate with upper support tubes 143 to connect lower tubes 152 to upper tube 122 when frame 112 is in the recumbent configuration. In one embodiment of the invention, top portions 153 of lower tubes 152 are configured to slide into inside upper support tubes 143 and selectively lock in place.

Rear frame portion 116 includes a pair of back tubes 154 that extend upwardly from the rear end of lower tubes 152. Back tubes 154 are joined together at their upper end to support a connection tube 155 that holds pin 153 and receives a portion of upper tube 122 when clip 151 engages pin 153. A seat back 182 is pivotally connected between back tubes 154 and may be pivoted up into the position depicted in FIG. 8 when frame 112 is converted to the recumbent configuration. Tube 155 is configured to receive a portion of seat back 182 as depicted in FIG. 8.

Pairs of rear supports 156 and 158 extend rearwardly from back tubes 154 to support rear wheel 144. A seat support 157 extends rearwardly from the top of back tubes 154 to support the tandem seat 184. Supports 157 may be further supported by supports 159 extending down to the hub of wheel 144.

Rear gear box 166 is supported at the bottom portion of lower tubes 152. A drive sprocket 160 is connected to the output shaft of rear gear box 166. Cranks 170 are designed to connect with gear box 166 to drive sprocket 160. Sprocket 160 is connected to a follower sprocket 162 by a chain 164.

Figure 10:
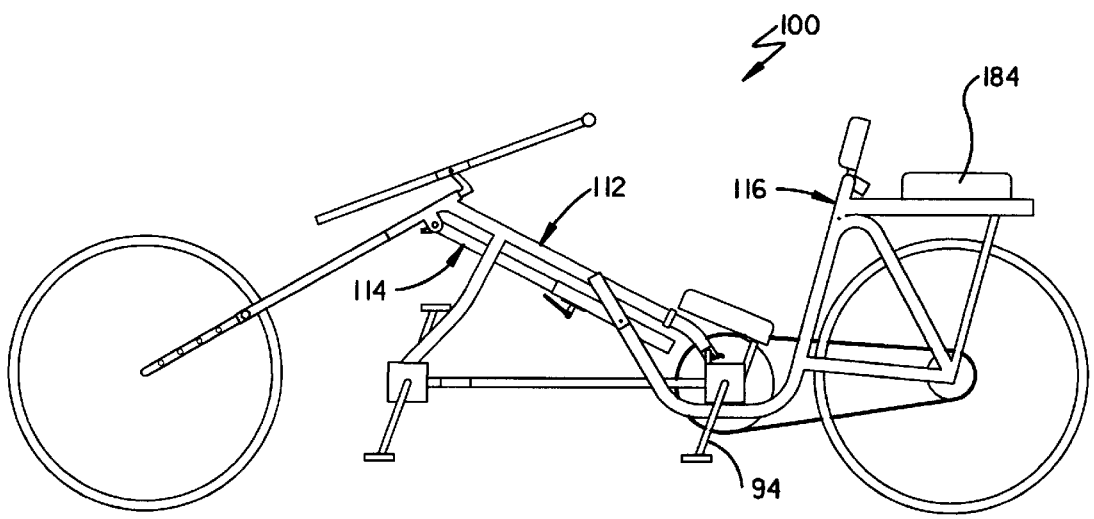
FIG. 10 is a view similar to FIG. 9 showing the second embodiment of the invention in the tandem position.

Recumbent seat posts 167 are disposed on or adjacent gear box 166 so that seat 146 may be connected to rear frame portion 116 when frame 112 is in the recumbent configuration as depicted in FIGS. 9 and 10.

Rear gear box 166 also includes a locking pin 171 that is configured to lock into clip 151 when frame 112 is configured into recumbent configuration as depicted in FIGS. 9 and 10.

Bicycle 100 is configured in the upright configuration by connecting lower tubes 124 to head tube 120 by using clip 130. Upper tube 112 of forward frame portion 114 is connected to rear frame portion 116 by latching clip 151 onto pin 153. Seat 146 is connected to upper tube 122. In this position, the user may ride bicycle 100 as an upright bicycle by providing power to bicycle 100 through cranks 170 that are connected to drive sprocket 160.

In order to convert bicycle 100 to a recumbent configuration, the user unlocks clip 130 and clip 151. The user then disconnects upper tube 122 from rear frame portion 116 and extends lower tube 114 by sliding telescoping portion 128 away from telescoping portion 127. The user then drops upper tube 122 down towards rear gear box 166 until the top portion 153 of lower tube 152 is aligned with upper support tubes 143. Lower tubes 152 are connected to upper support tubes 143 and clip 151 is locked onto pin 171.

The user then moves cranks 170 forward and connects them to forward gear box 142 as depicted in FIG. 9. The user may adjust handle bars 134 to a comfortable position. The user must also extend forks 132 so that front wheel 140 does not interfere with cranks 170. The user then installs drive shaft 90 as described above using the retractable end piece 92 to install drive shaft 90 between gear boxes 142 and 166. Seat 146 is moved down onto tubes 167 and seat back 182 is pivoted upwardly. The user may then ride bicycle 100 in the recumbent position.

The user may convert bicycle 100 to a tandem bicycle by adding secondary cranks 94 to gear box 166. The second rider rides on tandem seat 184 and peddles second crank 194. Gear boxes 142 and 166 function the same as gear boxes 42 and 66 described above with respect to the first embodiment of the invention.

Figure 11:
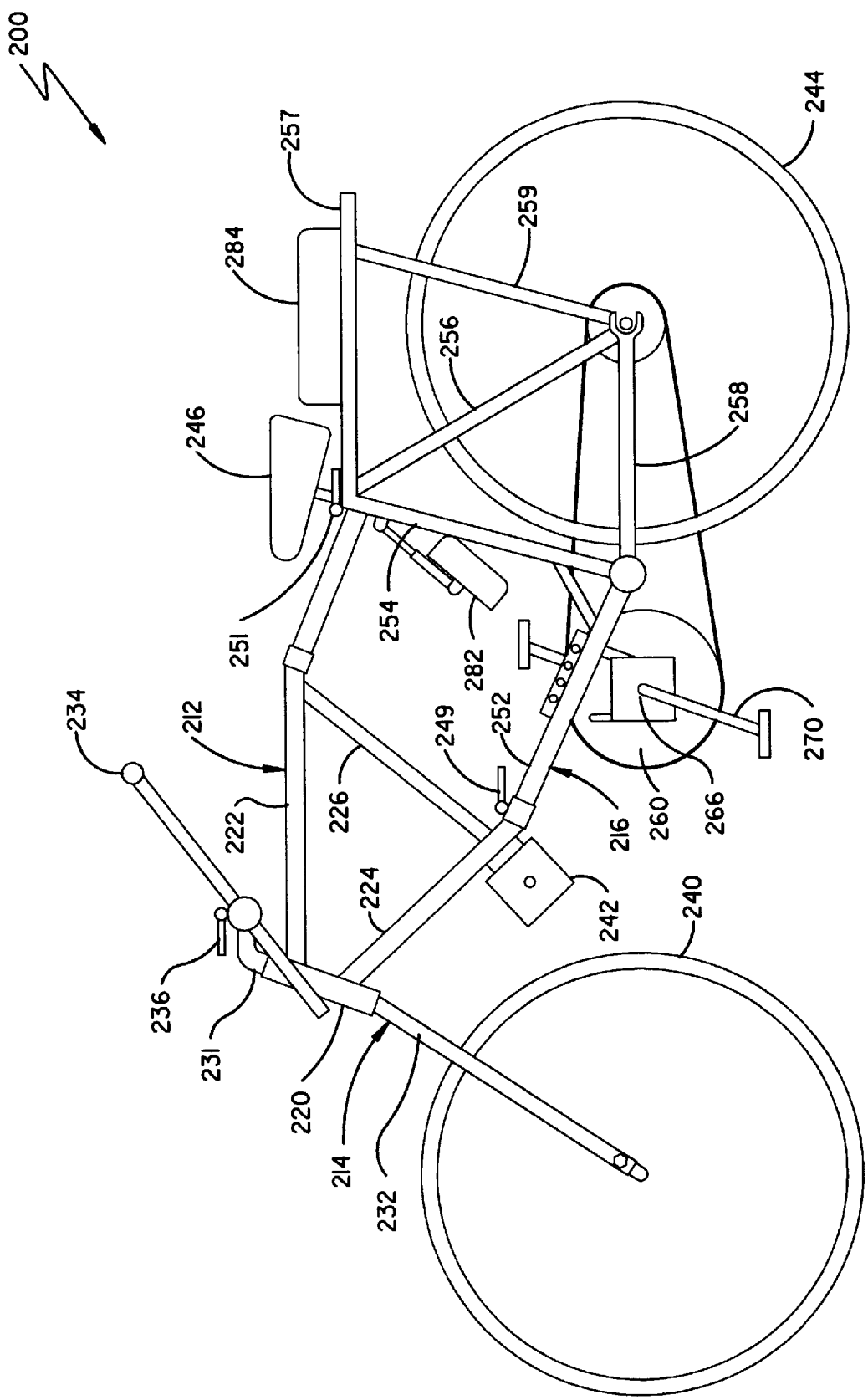
FIG. 11 is a side elevational view of a third embodiment of the bicycle in an upright configuration.
Figure 12:
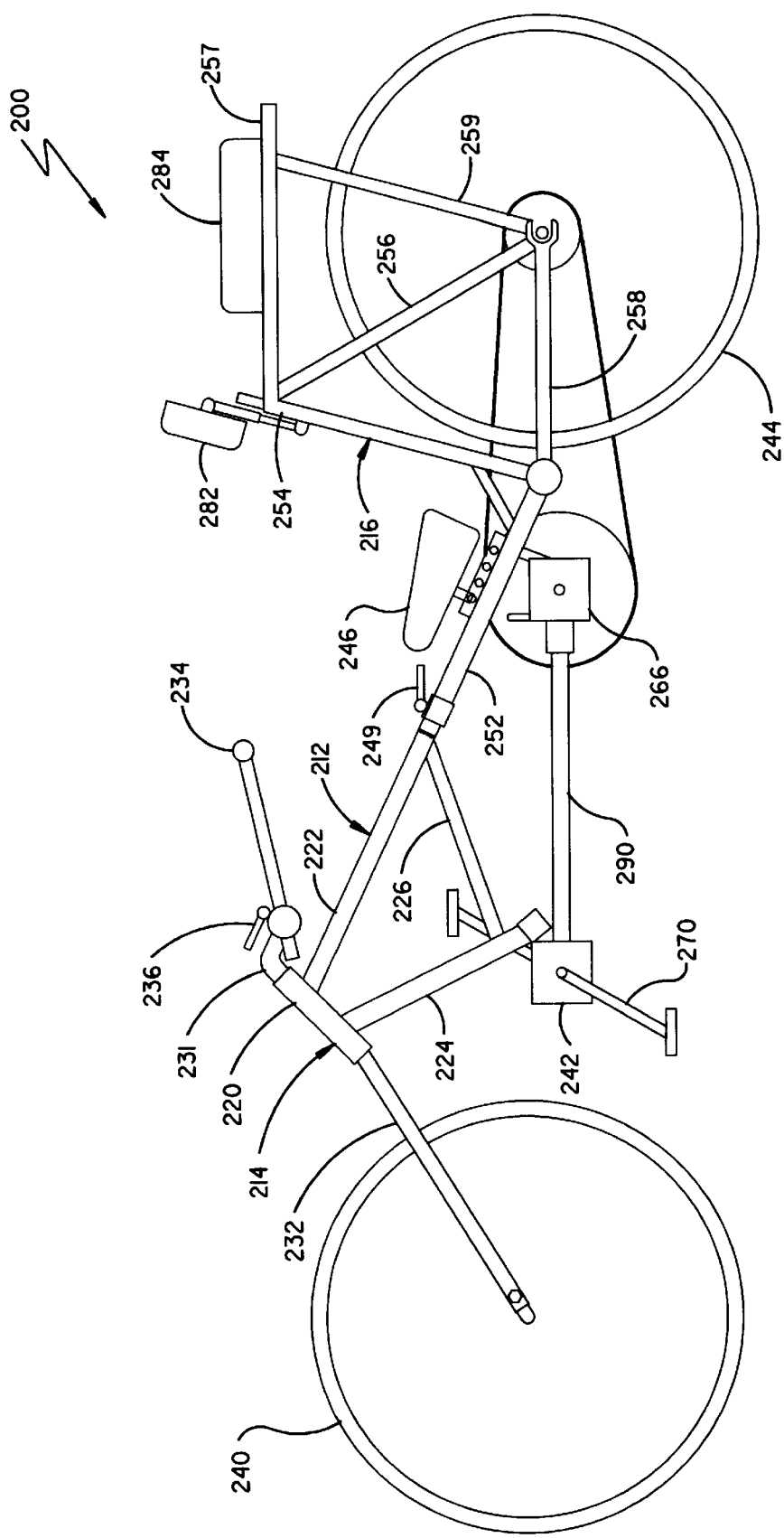
FIG. 12 is a side elevational view of the third embodiment in a recumbent configuration.

The third embodiment of the bicycle of the present invention is indicated generally by the numeral 200 in FIGS. 11 and 12. Bicycle 200 generally includes a frame 212 that includes a forward frame portion 214 and a rear frame portion 216. Bicycle 200 is capable of being converted between the upright position depicted in FIG. 11 and the recumbent position depicted in FIG. 12. The position in FIG. 12 may also be used as the tandem position.

Forward frame portion 214 includes a head tube 220, an upper tube 222, a lower tube 224, and a support tube 226. Upper tube 222 may include an extension as shown in FIG. 11 or may be shortened as shown in FIG. 12. Tubes 220, 222, 224, and 226 are connected together to form a rigid structural member. Bicycle 200 further includes a neck 231 that is connected to forks 232. Handle bars 234 are connected to neck 231 by an appropriate clamp 236 that may be configured to allow the length of handle bars 234 to be adjusted. Clamp 236 may also allow handle bars 234 to be pivoted downwardly as shown in FIG. 12. The front wheel 240 is connected to the end of forks 232 in a manner known in the art. Forks 232 also may have an adjustable length so that front wheel 240 may be moved away from forward frame portion 214 when bicycle 200 is in the recumbent configuration if such movement is necessary or desired. Fork 232 may include a telescoping member as described above.

A forward gear box 242 is carried by forward frame portion 214 in a position where it is aligned with the rear gear box 266 when bicycle 200 is in the recumbent configuration as shown in FIG. 12. Forward gear box 242 may be carried by tube 224 or tube 226. In other embodiments, forward gear box 242 may be carried by a flange that is connected to forward frame portion 214. Gear box 242 functions in a manner similar to the gear boxes described above and may be rigidly connected to forward frame portion 214. In other embodiments, gear box 242 may be selectively pivotally connected to forward frame portion 214 to allow its position to be adjusted in embodiments of bicycle 200 that have adjustable frame members.

The rear end of upper tube 222 includes a clip 251 that is configured to selectively engage rear frame portion 216. Clip 251 may be designed to automatically lock onto a pin similar to pin 153 described above when clip 251 engages the pin. In other embodiments of the invention, a different type of connector may be used to connect tube 222 to rear frame portion 216. Such a clip may include a U-shaped latching portion and a lever that pulls the U-shaped latching portion tight against a hook. The lever may lock the latching portion in the locked position. A similar clip or connector 249 connects the lower end of tube 224 to rear frame portion 216. In the embodiment of the invention depicted in FIGS. 11 and 12, clip 249 is connected to lower tube 252 of rear frame portion 216 so that it may be used to connect with tube 222 when frame 212 is converted to the recumbent position as depicted in FIG. 12.

Rear frame portion 216 includes lower tube 252 that is configured to align with tube 224 in the upright position as depicted in FIG. 11 and tube 222 when frame 212 is configured in the recumbent position as depicted in FIG. 12. Rear frame portion 216 includes a back tube 254 that extends up to support the seat 246 of bicycle 200. A seat back 282 is pivotly connected to back tube 254 so that is may pivot out of the way when bicycle 200 is in the upright position depicted in FIG. 11 and may be pivoted upwardly to form a seat back when bicycle 200 is in the recumbent position as depicted in FIG. 12. Pairs of rear supports 256 and 258 extend rearwardly from back tube 254 to support rear wheel 244. A seat support 257 extends rearwardly from the top of back tube 254 to support the tandem seat 284. Supports 257 may be further supported by supports 259.

Rear gear box 266 is supported at the bottom portion of lower tube 252. Cranks 270 are designed to selectively connect with gear box 266 to drive sprocket 260 when frame 212 is in the upright position as depicted in FIG. 11. When frame 212 is configured to be in the recumbent position as depicted in FIG. 12, cranks 270 are moved forward to forward gear box 242 and a drive shaft 290 is positioned between gear boxes 242 and 266 to allow the rider to power bicycle 200. In order to use bicycle 200 as a tandem bicycle, a second set of cranks 270 are supplied and attached to rear gear box 266.

In order to convert from the upright position of FIG. 11 to the recumbent position of FIG. 12, the user detaches clips 249 and 251 and separates frame portion 214 from frame portion 216. The user then aligns tube 252 with tube 222 and attaches them together with clip 249. Frame 212 is then in the recumbent position. The user then moves seat 246 down to frame 252 and flips seat back 282 upwardly. In this position, seat 246 is positioned well below the top edge of rear wheel 244 to lower the center of gravity of bicycle 200 when frame 212 is in the recumbent position. The user moves cranks 270 up to gear box 242 and snaps drive shaft 290 between boxes 242 and 266.

Accordingly, the improved bicycle capable of being converted between upright, recumbent, and tandem configurations apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the bicycle capable of being converted between upright, recumbent, and tandem configurations is constructed and used, the characteristics of the construction, and the advantageous new and useful results obtained; the new and useful structures, devices, elements, arrangements, parts, and combinations are set forth in the appended claims.

What is claimed is:

1. A bicycle convertible between upright and recumbent positions, the bicycle comprising:
   a forward frame portion;
   a rear frame portion;
   the rear frame portion being selectively connectable to the forward frame portion in an upright configuration and a recumbent configuration;
   a rear gear box carried by the rear frame portion;
   a forward gear box carried by the forward frame portion; and
   a drive shaft positioned between the gear boxes when the frame portions are in the recumbent position.

2. The bicycle of claim 1, further comprising forks connected to the forward frame portion; the length of the forks being adjustable.

3. The bicycle of claim 1, further comprising handlebars connected to the forward frame portion; the angle of the handlebars being adjustable with respect to the forward frame portion.

4. The bicycle of claim 1, further comprising handlebars connected to the forward frame portion; the length of the handlebars being adjustable with respect to the forward frame portion.

5. The bicycle of claim 1, further comprising a seat selectively connectable to the rear frame portion in a first position when the frame is in the upright configuration and in a second position when the frame is in the recumbent position.

6. The bicycle of claim 5, further comprising a rear wheel connected to the rear frame portion; rear wheel having a top edge; the seat being positioned lower than the top edge of the rear wheel when the frame is in the recumbent position.

7. The bicycle of claim 1, further comprising a seat back pivotally connected to the rear frame portion.

8. The bicycle of claim 1, further comprising a first pair of cranks connected to the forward gear box when the frame is in the recumbent position.

9. The bicycle of claim 8, further comprising:
   a second pair of cranks connected to the rear gear box when the frame is in the recumbent position; and
   a second seat carried by the rear frame portion so that the bicycle may be used as a tandem bicycle.

10. The bicycle of claim 1, further comprising a first clip used to connect the forward and rear frame portions together.

11. The bicycle of claim 10, further comprising a second clip used to connect the forward and rear frame portions together.

12. A bicycle convertible between upright and recumbent positions, the bicycle comprising:
    a forward frame portion;
    a rear frame portion;
    the rear frame portion being selectively connectable to the forward frame portion in an upright configuration and a recumbent configuration;
    a rear gear box carried by the rear frame portion;
    a forward gear box carried by the forward frame portion;
    the forward and rear gear boxes being aligned when the rear frame portion is connected to the forward frame portion in the recumbent position;
    a drive shaft positioned between the gear boxes when the frame portions are in the recumbent position.

13. The bicycle of claim 12, wherein one portion of the rear frame portion is pivotally connected to a portion of the forward frame portion.

14. The bicycle of claim 13, wherein the portion of the forward frame portion that is pivotally connected with the rear frame portion telescopes between first and second positions.

15. The bicycle of claim 14, wherein the forward frame portion clips to a first portion of the rear frame portion when the frame is in the upright position and wherein the forward frame portion clips to a second portion of the rear frame portion when the frame is in the recumbent position.

16. A bicycle convertible between upright and recumbent positions, the bicycle comprising:
    a forward frame portion having an upper frame tube;
    a rear frame portion having a back tube extending up from a lower tube; the back tube having an upper end;
    the upper frame tube being selectively connected to the back tube adjacent the upper end of the back tube to configure the frame portions in an upright frame configuration; and
    the upper frame tube being selectively connected to the lower tube of the rear frame portion to configure the frame portions in a recumbent frame configuration.

17. The bicycle of claim 16, further comprising:
    a rear gear box carried by the rear frame portion;
    a forward gear box carried by the forward frame portion;
    the forward and rear gear boxes being aligned when the rear frame portion is connected to the forward frame portion in the recumbent position; and
    a drive shaft positioned between the gear boxes when the frame portions are in the recumbent position.

18. The bicycle of claim 16, further comprising a seat connected to the rear frame portion adjacent the upper end of the back tube when the frame is in the upright position.

19. The bicycle of claim 18, wherein the seat is connected to lower tube of the rear frame portion when the frame is in the recumbent position.

20. The bicycle of claim 19, further comprising a seat back pivotally connected to the back tube.

* * * * *